G. MICHOT.
PULLING FLAX AND THE LIKE.
APPLICATION FILED AUG. 31, 1915.
1,175,004.
Patented Mar. 14, 1916.
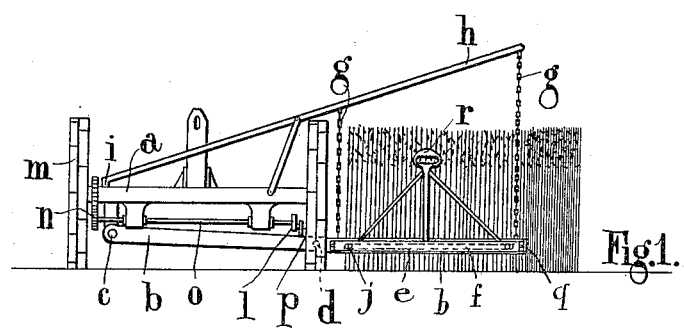
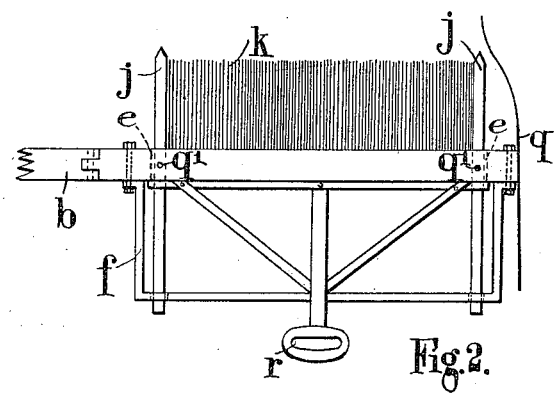
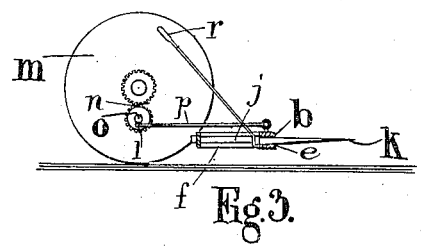
Witnesses:
Inventor

UNITED STATES PATENT OFFICE.

GEORGES MICHOT, OF BELFAST, IRELAND, ASSIGNOR TO THE FIBRE CORPORATION (IRELAND) LIMITED, OF BELFAST, IRELAND.

PULLING FLAX AND THE LIKE.

1,175,004.

Specification of Letters Patent. Patented Mar. 14, 1916.

Application filed August 31, 1915. Serial No. 48,344.

*To all whom it may concern:*

Be it known that I, GEORGES MICHOT, a subject of the King of Great Britain and Ireland, and residing at 40 Frederick street, Belfast, Ireland, have invented certain new and useful Improvements Relating to the Pulling of Flax and the like, of which the following is a specification.

This invention relates to improvements in machines for the pulling of flax or like crops which require to be pulled from the ground and not cut.

Considerable difficulties have hitherto existed in the pulling of flax or the like by mechanical means, and at present flax is practically universally pulled by hand.

It has hitherto been proposed to construct weeding and seed-gathering machines having sets of combs mounted upon a drum disposed between the supporting wheels, the drum being adapted to revolve as the machine travels along the ground, and cause the sets of combs to move inward and outward as they revolve with the drum so as to automatically discharge the weeds from the combs. As however in dealing with flax and like crops it is desirable that as little injury as possible be inflicted upon the stalks during the pulling operation, and also that the material be discharged from the machine in the form of a beet or bundle without being tossed, one of the objects of the present invention is to provide a machine in which these advantages are attained.

According to the present invention a comb is adapted to be oscillated horizontally as the machine travels along the ground, so as to uproot the flax which is allowed to accumulate upon the comb until it is discharged therefrom in the form of a beet or bundle at intervals by a movement of the comb.

Referring now to the accompanying drawings: Figure 1 shows an elevation of a machine constructed according to my invention, while Fig. 2 shows a plan or part of the same on an enlarged scale. Fig. 3 is a detail showing the mechanism for oscillating the comb.

In carrying this invention into effect in one form, I provide a horse-drawn frame, $a$, similar to that of a reaping machine. On this I mount transversely a beam which is pivoted at $c$ with a certain amount of lateral play as well as being pivoted at $d$, to permit of horizontal adjustment. The beam projects out laterally at right angles to the direction of movement of the machine in operation. This beam extends beyond the machine by an amount corresponding to the width of the flax to be operated on. The beam is formed with a horizontal slot $e$ and has a more or less horizontal frame $f$ mounted on it. The beam and frame are supported by chains $g$ from a bar $h$, which also extends across the machine and is anchored at the point $i$, being supported also from the main axle of the machine.

In the slot $e$, and supported by the frame, $f$, is a sliding structure like a comb comprising side members, $j$, and a row of teeth, $k$, conveniently about eight inches long. The comb is conveniently about three feet wide. The teeth are pointed to enter into the flax and may be round or wedge shaped. Means are provided for giving the beam carrying the comb an oscillating movement horizontally. This movement may preferably be effected by a crank $l$, driven from the vehicle wheels $m$, by means of gearing $n$, and a shaft, $o$. The crank, $l$, is operatively connected with the beam, $b$, by means of a connecting rod, $p$. Instead of using a crank an eccentric or other suitable device may be used to impart the oscillating movement to the beam. A guide $q$ is provided on the end of the beam for deflecting the standing flax and preventing it being damaged by the passage of the machine. The comb is provided with a handle $r$, so that it may be pulled back on the beam to discharge the flax which has been picked up on the teeth, means such as the removable pins $q'$ being provided for locking the comb in the forward position. The comb may be arranged at any desired height from the ground, and is preferably supported in such a position that it can pass over the discharged beet or bundle lying on the ground.

The operation of the machine is a follows: As the machine advances, the stalks are forced between the teeth of the comb and are prevented from slipping through by the seed bolls and small branches of the stalks. The movement of the comb, which is a backward and forward one, resulting from the operation of the crank $l$, causes the stalks to be jerked out of the ground and carried on the comb until the latter is full. The comb is then pulled back by means of the handle r and the flax is released and discharged from the teeth as they pass rearwardly of the beam. The comb is then reset and the action described above is repeated as the machine proceeds.

Having now described my invention what I claim as new and desire to secure by Letters Patent is:—

1. A machine for pulling flax and like roots, comprising a carriage, wheels supporting said carriage, a comb mounted on said carriage, the teeth of said comb being arranged in a horizontal plane and directed toward the direction of travel of said carriage, and means whereby said comb is reciprocated in a direction parallel to the direction of travel of the carriage.

2. A machine for pulling flax and like roots, comprising a carriage, wheels supporting said carriage, a comb mounted on said carriage at the side thereof and disposed without the zone of said wheels, the teeth of said comb being arranged in a horizontal plane and directed toward the direction of travel of said carriage, and means whereby said comb is reciprocated in a direction parallel to the direction of travel of the carriage.

3. A machine for pulling flax and like roots, comprising a carriage, wheels supporting said carriage, a beam supported by said carriage and extending beyond the side thereof, a comb mounted on the extended portion of the beam, the teeth of the comb being arranged in a horizontal plane and directed toward the direction of travel of said carriage, and means whereby said comb is reciprocated in a direction parallel to the direction of travel of the carriage.

4. A machine for pulling flax and like roots, comprising a carriage, wheels supporting said carriage, a supporting member mounted transversely on said carriage and extending beyond the side thereof, a beam pivoted at one end to said carriage and extending beyond the side thereof, chains connecting the extended portions of the supporting member and said beam, a comb mounted on said extended portion of the beam, the teeth of the comb being arranged in a horizontal plane and directed toward the direction of travel of said carriage, and means whereby said comb is reciprocated in a direction parallel to the direction of travel of the carriage.

5. A machine for pulling flax and like roots, comprising a carriage, wheels supporting said carriage, an axle connecting said wheels, a shaft supported by said carriage, gear wheels mounted on said axle and said shaft and adapted to mesh, a crank disk mounted on said shaft, a supporting member mounted transversely on said carriage and extending beyond the side thereof, a beam pivoted at one end to said carriage and extending beyond the side thereof, a connecting rod connecting said beam to the crank disk, chains connecting the extended portions of the supporting member and said beam, a comb mounted on said extended portion of the beam, the teeth of the comb being arranged in a horizontal plane and directed toward the direction of travel of said carriage.

6. A machine for pulling flax and like roots comprising a carriage, wheels supporting said carriage, an axle connecting said wheels, a shaft supported by said carriage, gear wheels mounted on said axle and shaft adapted to mesh, a crank disk mounted on said shaft, a supporting member mounted transversely on said carriage and extending beyond the side thereof, a beam pivoted at one end to said carriage and extending beyond the side thereof and having an aperture in said extended portion, a connecting rod connecting said beam to the crank disk, a frame mounted on said beam at the rear thereof and adjacent said aperture, chains connecting the extended portions of the supporting member and said beam, a comb mounted in said frame and adapted to protrude through said aperture, the teeth of the comb being arranged in a horizontal plane and directed toward the direction of travel of said carriage, locking devices for retaining the comb in the forward position, a handle for withdrawing the comb through said aperture, and a guide mounted on the outer free end of said beam.

In testimony whereof I have signed my name to this specification.

GEORGES MICHOT.

Copies of this patent may be obtained for five cents each, by addressing the "Commissioner of Patents, Washington, D. C."